(12) United States Patent
Page

(10) Patent No.: US 12,168,506 B2
(45) Date of Patent: Dec. 17, 2024

(54) APPARATUS FOR INGESTING BOUNDARY LAYER FLOW FOR AN AIRCRAFT

(71) Applicant: JETZERO, INC., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/375,540

(22) Filed: Oct. 1, 2023

(65) Prior Publication Data

US 2024/0253773 A1    Aug. 1, 2024

Related U.S. Application Data

(63) Continuation of application No. 18/102,342, filed on Jan. 27, 2023, now Pat. No. 11,827,339.

(51) Int. Cl.
*B64C 21/01* (2023.01)
*B64C 21/06* (2023.01)
(Continued)

(52) U.S. Cl.
CPC ............ *B64C 21/01* (2023.01); *B64C 21/06* (2013.01); *B64C 39/10* (2013.01); *B64D 29/00* (2013.01);
(Continued)

(58) Field of Classification Search
CPC ......... B64C 21/01; B64C 21/06; B64C 39/10; B64C 2039/105; B64D 29/04; B64D 2033/0226
See application file for complete search history.

(56) References Cited

U.S. PATENT DOCUMENTS 6,527,224 B2    3/2003  Seidel
6,543,718 B2    4/2003  Provost
(Continued)

FOREIGN PATENT DOCUMENTS

WO    2008017567 A1    2/2008
WO    2021007216 A1    1/2021

OTHER PUBLICATIONS

Daggett et al, Blended Wing Body Systems Studies: Boundary Layer Ingestion Inlets with Active Flow Control, Dec. 31, 2003.
(Continued)

*Primary Examiner* — Nicholas McFall
(74) *Attorney, Agent, or Firm* — Caldwell Intellectual Property Law

(57) ABSTRACT

An apparatus for ingesting boundary layer flow on an aircraft, the apparatus includes a blended wing body, wherein the blended wing body is characterized by having no clear dividing line between wings and main body of the aircraft, wherein the blended wing body includes a nacelle located aft of a leading edge of the blended wing body, wherein the nacelle includes a propulsor configured to propel the aircraft, a primary duct, and a flow augmentation arrangement, wherein the flow augmentation arrangement is configured to accelerate a boundary layer flow in the airflow, wherein the flow augmentation arrangement further includes a secondary duct, wherein the secondary duct configured to ingest the boundary layer flow in the airflow from an inlet proximal to a forward portion of the nacelle to an outlet proximal to a rear portion of the nacelle and a tertiary duct between the primary duct and the secondary duct.

20 Claims, 7 Drawing Sheets

(51) Int. Cl.
*B64C 39/10* (2006.01)
*B64D 29/00* (2006.01)
*B64D 29/04* (2006.01)
*B64D 33/02* (2006.01)

(52) U.S. Cl.
CPC ........ *B64D 29/04* (2013.01); *B64C 2039/105* (2013.01); *B64D 2033/0226* (2013.01)

(56) References Cited

U.S. PATENT DOCUMENTS

| | | |
|---|---|---|
| 9,126,679 B2 | 9/2015 | Lippinois et al. |
| 9,266,617 B2 * | 2/2016 | Rebhi .................... B64D 27/02 |
| 11,396,365 B2 | 7/2022 | Page |
| 11,827,339 B1 | 11/2023 | Page |
| 2020/0331591 A1 | 10/2020 | Page et al. |

OTHER PUBLICATIONS

Agile, Use Case—Blended Wing Body (boundary layer ingestion), Oct. 19, 2019.

* cited by examiner

APPARATUS FOR INGESTING BOUNDARY LAYER FLOW FOR AN AIRCRAFT

CROSS-REFERENCE TO RELATED APPLICATIONS

This application is a continuation of Non-provisional application Ser. No. 18/102,342, filed on Jan. 27, 2023, and entitled "AN APPARATUS FOR INGESTING BOUNDARY LAYER FLOW FOR AN AIRCRAFT," the entirety of which is incorporated herein by reference.

FIELD OF THE INVENTION

The present invention generally relates to the field of aircraft. In particular, the present invention is directed to an apparatus for ingesting boundary layer flow for an aircraft.

BACKGROUND

Present aircraft avoid boundary layer flow entering the nacelle by placing nacelle below and ahead of the leading edge of the wing to allow engines operate in a uniform inlet flow. However, when nacelles are located elsewhere, other solutions for addressing the boundary layer flow are needed.

SUMMARY OF THE DISCLOSURE

In an aspect, an apparatus for ingesting boundary layer flow on an aircraft, wherein the apparatus includes a blended wing body, wherein the blended wing body is characterized by having no clear dividing line between wings and main body of the aircraft, wherein the blended wing body includes a nacelle located aft of a leading edge of the blended wing body, wherein the nacelle further includes a propulsor configured to propel the aircraft, a primary duct, wherein the primary duct configured to intake an airflow from a forward portion of the nacelle to a rear portion of the nacelle, and a flow augmentation arrangement, wherein the flow augmentation arrangement is configured to accelerate a boundary layer flow in the airflow, wherein the flow augmentation arrangement further includes a secondary duct, wherein the secondary duct configured to ingest the boundary layer flow in the airflow from an inlet proximal to the forward portion of the nacelle to an outlet proximal to the rear portion of the nacelle and a tertiary duct between the primary duct and the secondary duct.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a blended wing body aircraft having an optimized cabin space and methods of manufacture. In an embodiment, a blended wing body aircraft has a compromised airfoil shape at a forward face of a non-wing portion of the blended wing body.

Aspects of the present disclosure can be used to ingest boundary layer flow on aircraft. Aspects of the present disclosure can also be used to improve aircraft propulsor efficiency.

Aspects of the present disclosure allow for accelerating boundary layer flow instead of avoiding boundary layer flow by placing aircraft engines below and ahead of the wings. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 4. Furthermore, there is no intention to be bound by any expressed or implied theory presented in this disclosure.

Figure 1:
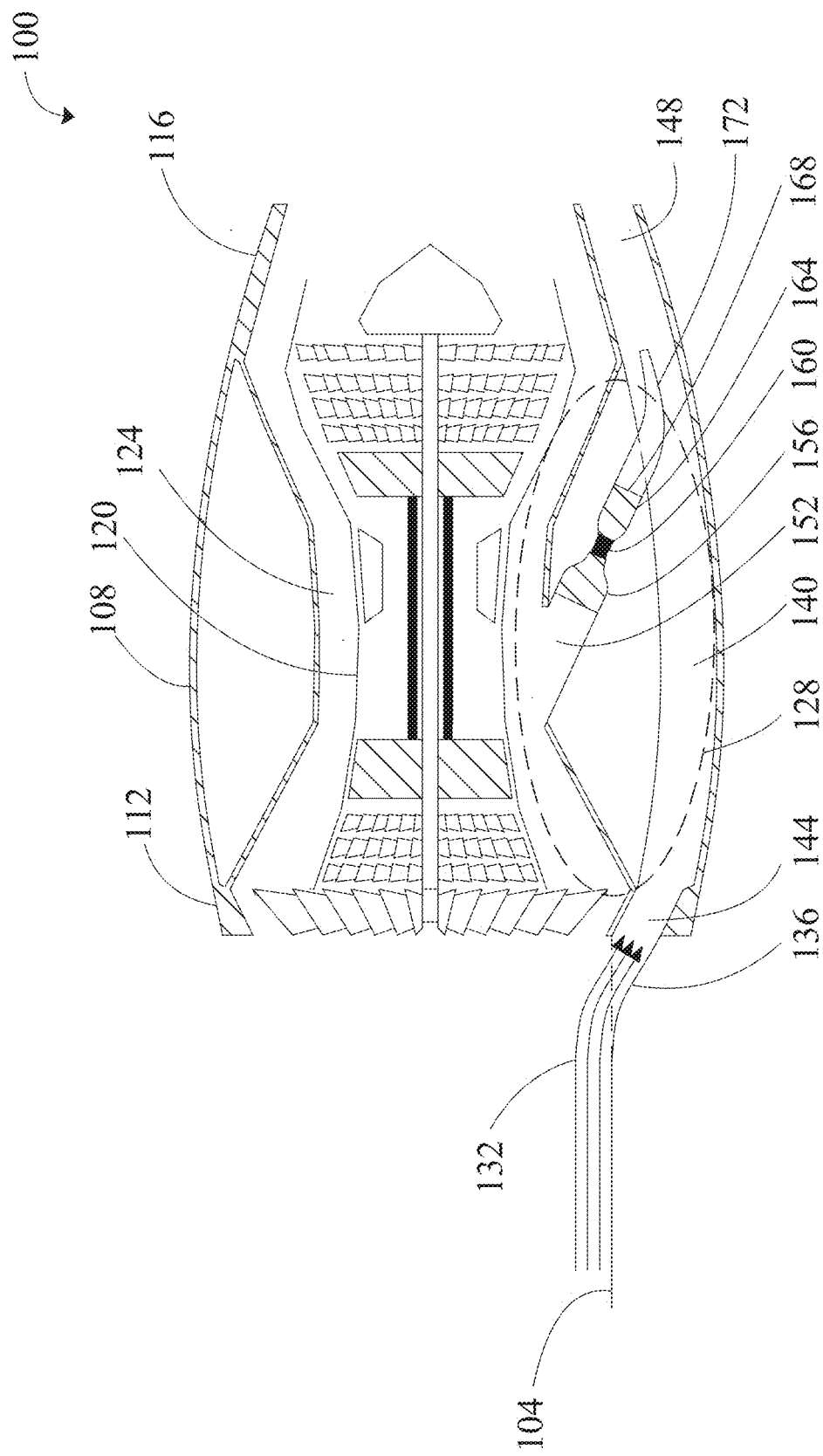
FIG. 1 is a cross-section view of an exemplary apparatus for ingesting boundary layer flow on an aircraft.

Referring now to FIG. 1, an exemplary apparatus for ingesting boundary layer flow on an aircraft is illustrated. Apparatus 100 may include a blended wing body (BWB). Briefly, a blended wing body may be understood as an aircraft body type where no clear boundary exists between wings and main body substantially at a leading edge of the wings. A blended wing body may include any blended wing body described in this disclosure and is described in detail in reference to FIG. 4, below. A BWB may be contrasted by a wing tube body which has a clear transition between a tube fuselage and wings. In some cases, a BWB may be contrasted by a flying wing, which effectively has no transition between wing and main body, as it theoretically comprises only a wing. In some embodiments, BWB may further include a plurality of airfoil segments. As used in this disclosure, an "airfoil segment" is a section (i.e., region) of aircraft 100. In some embodiments, BWB may further include an outer mold line 104 (OML). As used in this disclosure, an "outer mold line" is airfoil segment's outer surface. In some cases, OML may include a plurality of OML shapes. For a non-limiting example, a first OML may be in a convex shape, wherein the first OML may be located at a front airfoil segment of aircraft 100. For another non-limiting example, a second OML may be in a concave shape, wherein the second OML may be located at an aft airfoil segment of aircraft 100.

With continued reference to FIG. 1, apparatus 100 includes a nacelle 108 located aft of leading edge of BWB. As used in this disclosure, a "leading edge" is a foremost edge of BWB. As used in this disclosure, a "nacelle" is a streamlined body housing, which is sized according to that which is houses, such as without limitation an engine, a fuel store, or a flight component. In a non-limiting example, nacelle 108 may be an aerodynamic and functional structure that surrounds an aircraft engine. In some embodiments, nacelle 108 may further include a forward portion 112, wherein the forward portion 112 is the part of nacelle 108 that first encounters airflow. In some embodiments, nacelle 108 may further include a rear portion 116, wherein the rear portion 116 is the part of nacelle 108 that exhausts airflow. In some cases, nacelle 108 may be in a cylindrical shape. In a non-limiting example, forward portion 112 of nacelle 108 may include a first diameter and rear portion 116 of nacelle 108 may include a second diameter, wherein the first diameter is different than the second diameter. In some embodiments, nacelle 108 further include a propulsor 120. As used in this disclosure, a "propulsor" is a mechanical device that provides propulsion for aircraft. In an embodiment, propulsor 120 is further configured to propel aircraft. In some cases, propulsor 120 may include a fan, wherein the fan may include a plurality of fan blades and may be located within front portion 112 of nacelle 108. In a non-limiting example, nacelle may be a structure that surrounds a propulsor, wherein the propulsor may include a gas turbine with a propulsive fan. In some embodiments, propulsor 120 may include a turbofan engine. In a non-limiting example, propulsor 120 may be further configured to comprise airflow from front portion 112 of nacelle 108, combust the airflow, and exhaust the airflow from rear portion 116 of nacelle 108. Propulsor disclosed here will be described in further detail below.

With contoured reference to FIG. 1, in some embodiments, without limitation, nacelle 108 may include a cowling, wherein the cowling is a removable covering of propulsor 120. In some embodiment, without limitation, nacelle 108 may include a thrust reverser, wherein the thrust reverser is a mechanical device that provide a temporary diversion of thrust from propulsor 120. In some cases, thrust reverser may allow deceleration of aircraft. Additionally, or alternatively, thrust reverser may include, but is not limited to, target thrust reverser, clam-shell thruster reverser, cold stream thrust reverser, and the like thereof. In some embodiments, without limitation, nacelle 108 may further include a fan cowl, wherein the fan cowl may provide an aerodynamic surface over a fan case of propulsor 120 between forward portion 112 of nacelle and thrust reverser. In some embodiments, without limitation, nacelle 108 may further include an exhaust nozzle, wherein the exhaust nozzle is a nozzle to produce thrust. In some cases, exhaust nozzle may include a specially shaped tube through which air flow. As will be appreciated by persons having ordinary skill in the art, after having read the entirety of this disclosure, the foregoing list is provided by way of example and components of nacelle 108 can be added as an extension or improving the apparatus 100 disclosed herein.

With continued reference to FIG. 1, in some embodiments, nacelle 108 may be configured to be located within a depression 136 in OML 104. As used in this disclosure, a "depression" is a concavity of OML 104. For example, nacelle 108 may be partially buried within an aft segment of BWB. In some cases, propulsor 120 may slightly above OML 104. In other cases, sides of nacelle 108 may extend to OML 104. In some embodiment, nacelle 108 may further include a pylon, wherein the pylon is a component that connects nacelle 108 to OML 104 of airfoil segment of BWB. In some cases, pylon may prevent undesired disturbance of airflow toward wing of BWB. In other cases, pylon may be designed to be aerodynamic to reduce air resistance. As a non-limiting example, pylon may have an airfoil cross section shape, such as a NACA airfoil.

With continued reference to FIG. 1, nacelle 104 further includes a primary duct 124. In an embodiment, primary duct 124 is configured to intake an airflow from the forward portion 112 of the nacelle 108 to the rear portion 116 of the nacelle 108. As used in this disclosure, a "primary duct" is a main intake duct of propulsor 120 within nacelle 108. In some cases, primary duct 124 may be configured to be surround propulsor 120. In some embodiments, primary duct 124 may include a duct channel, wherein the duct channel is a pathway that directs airflow from forward portion 112 of nacelle 108. In some embodiments, primary duct 124 may include a primary duct inlet. In some cases, primary duct inlet may be located at forward portion 112 of nacelle 108 and may be configured to intake airflow from forward portion 112 of nacelle 108. In other embodiments, primary duct 124 may include a primary duct outlet. In some cases, primary duct outlet may be located at rear portion 116 of nacelle 108 and may be configured to exhaust airflow within duct channel from rear portion 116 of nacelle 108. Additionally, or alternatively, primary duct 124 may include a NACA duct, wherein the NACA duct is an intake duct allows airflow to enter an internal duct with a minimal disturbance to airflow. In some embodiments, without limitation, primary duct 124 may be a submerged duct, wherein the submerged duct may further include a shallow ramp with curved surface that recessed into OML 104. In other embodiments, without limitation, primary duct 124 may be a bypass duct, wherein the bypass duct may further be configured to reduce fuel consumption and/or propulsor noise. In some cases, bypass duct may provide cooling airflow for propulsor 120 within nacelle 108.

With contoured reference to FIG. 1, in some embodiments, primary duct may be further configured to intake a uniform inlet flow. As used in this disclosure, a "uniform inlet flow" is an airflow that is uniformed in terms of the airflow angle and the airflow speed across core of front portion 112 of nacelle 108. In some cases, variations in airflow angle and airflow speed may cause a variation in angle of attack of plurality of fan blade and thrust, therefore, reduce fan efficiency. As used in this disclosure, an "angle of attack" attack is an angle between a center line of propulsor 120 and a vector representing relative motion between nacelle 108 and the atmosphere. In some embodiments, uniform inlet flow may be a uniformly off-axis flow. In a non-limiting example, uniformly off-axis flow may result in a cyclical variation in angle of attack of plurality of fan blade as fan moves around an axis, wherein the cyclical variation may further impose a cyclical structural load on fan of propulsor 120 within nacelle 108. Cyclical structural load may fatigue and/or fail fan and other components of apparatus 100. Additionally, or alternatively, uniform inlet flow may include a uniform flow direction, wherein the uniform flow direction may include different airflow speed across fan surface. In a non-limiting example, a boundary layer flow 132 may enter nacelle 108 from front portion 112, wherein the boundary layer flow 132 may impact angle of attack of plurality of fan blades as boundary layer flow 132 pass through fan of propulsor 120 and cause a once-per-revolution cycle. In some cases, without limitation, once-per-revolution cycle may reduce efficiency, increase noise, produce unfavorable cyclical structural load, and the like in propulsor 120 thereof.

With continued reference to FIG. 1, in some embodiments, propulsor 120 may include a bypass ratio (BPR). As used in this disclosure, a "bypass ratio" is a ratio between a mass flow rate of a bypass airflow to a mass flow rate of an airflow entering the propulsor 120, wherein the mass flow rate is the mass of airflow which passes per unit of time such as second, minute, hour, and the like thereof. As used in this disclosure, a "bypass airflow" is an airflow passes through primary duct 124 within nacelle 108. Additionally, or alternatively, bypass airflow may mix with airflow output from propulsor 120 at rear portion 116 of nacelle 108. Further, mixed airflow may be exhaust from the rear portion 116 of nacelle 108. In a non-limiting example, nacelle 108 may include a propulsor, wherein the propulsor may include a 0.1 bypass ratio, wherein the 0.1 bypass ratio manes that for 10 kilograms of air passes through primary duct 124, only 1 kilograms of air passes through propulsor 120. In other embodiments, propulsor 120 may further include an engine pressure ratio (EPR), wherein the engine pressure ratio is a total pressure ratio across propulsor 120. As will be appreciated by persons having ordinary skill in the art, after having read the entirety of this disclosure, the foregoing list is provided by way of example and other parameters for propulsor 120 can be added as an extension or improving the apparatus 100 disclosed herein.

With continued reference to FIG. 1, nacelle 108 further include a flow augmentation arrangement 128. As used in this disclosure, a "flow augmentation arrangement" is a particular arrangement that is configured to create additional flow in the secondary duct. In some embodiments, flow augmentation arrangement 128 is configured to accelerate a boundary layer flow 132 in the airflow. As used in this disclosure, a "boundary layer flow" is flow within a boundary layer, wherein the boundary layer is a thin layer of fluid in an immediate vicinity of a bounding surface formed by the fluid flowing along the bounding surface. In a non-limiting example, boundary layer flow 132 may be flow within boundary layer which formed by air flowing along OML 104. In some cases, boundary layer may include a no-slip boundary condition, wherein under the no-slip boundary condition, boundary layer flow 132 may have zero flow velocity relative to OML 104. In other cases, boundary layer flow 132 may include a flow velocity monotonically increases above OML 104 until returns to a bulk flow velocity. Additionally, or alternatively, boundary layer flow 132 may include a laminar boundary layer flow, wherein the laminar boundary layer flow is a very smooth flow. In some cases, laminar boundary layer flow may increase boundary layer as laminar boundary layer flow continues back from leading edge. Further, boundary layer flow 132 may include a turbulent boundary layer flow, wherein the turbulent boundary layer flow is a turbulent flow formed by decomposition of laminar boundary layer flow. In some cases, turbulent boundary layer flow may create more skin fraction drag then laminar boundary layer flow. Further, in some embodiments, flow augmentation arrangement may allow less power consumption of propulsor 120 for making thrust.

With continued reference to FIG. 1, flow augmentation arrangement 128 of apparatus 100 further include a secondary duct 140. In some cases, flow augmentation arrangement 128 of apparatus 100 may include a plurality of secondary ducts 140. As used in this disclosure, a "secondary duct" is a subordinate intake duct of propulsor 120 within nacelle 108. In some embodiments, secondary duct 140 is configured to ingest the boundary layer flow in the airflow from an inlet 144 proximal to the forward portion 112 of the nacelle 108 to an outlet 148 proximal to the rear portion 116 of the nacelle 108. Secondary duct 140 may include any duct described in this disclosure. In some embodiments, secondary duct 140 may be located below primary duct 124. In other embodiments, secondary duct 140 may be located within depression 136 in OML 104. In some cases, secondary duct 140 may be enlarged by depression 136 in OML 104. Depression 136 in OML 104 may be shaped to control a cross-sectional area of secondary duct 140 along a secondary duct length. In some embodiments, secondary duct 140 is further configured to route boundary layer flow 132 around nacelle 108 and exhaust boundary layer flow 132 from the rear portion 116 of nacelle 108. In an embodiment, secondary duct 140 may be further configured to prevent the boundary layer flow from entering an input of propulsor 120. In another embodiments, secondary duct 140 may be further configured to prevent a turbulent spillage from entering primary duct 124, wherein the turbulent spillage is turbulent airflow that is not ingested by secondary duct 140. In some cases, turbulent spillage may include turbulent boundary layer flow. In a non-limiting example, secondary duct 140 within nacelle 108 may be configured to prevent a turbulent boundary layer flow from entering primary duct 124 above secondary duct 140 within nacelle 108. For instance, and without limitation, secondary duct 140 may be consistent with the passageway disclosed in U.S. patent application Ser. No. 17/501,492, filed on Oct. 14, 2021, entitled "DRAG RECOVERY SCHEME USING BOUNDARY LAYER INGESTION".

With continued reference to FIG. 1, flow augmentation arrangement 128 of apparatus 100 further include a tertiary duct 152 in between primary duct 124 and secondary duct 140 within nacelle 108. In some embodiments, flow augmentation arrangement 128 may include a plurality of tertiary ducts 152. As used in this disclosure, a "tertiary duct" is a middle duct that directs airflow in between primary duct 124 and secondary duct 140. Tertiary duct may include any duct described in this disclosure. In some embodiments, tertiary duct 152 may be configured to connect primary duct 124 with secondary duct 140. In some embodiments, tertiary duct 152 may include a venturi pump. As used in this disclosure, a "venturi pump" is a particular pump that utilizes a venturi effect to pump a fluid such as air. As used in this disclosure, a "venturi effect" is an increase of fluid flow velocity and reduction in fluid pressure that results when a fluid flows through a constricted section. In some embodiments, venturi effect may also reference a Bernoulli's principle, wherein the Bernoulli's principle is a principle states that an increase in fluid flow speed occurs simultaneously with a decrease in static pressure or potential energy of fluid. In some embodiments, venturi pump may further include a venturi tube 168. As used in this disclosure, a "venturi tube" is a tubular setup within venturi pump. In some cases, venturi tube 168 may be configured to avoid undue aerodynamic drag. Further, in some embodiments, venturi tube may further include an entry cone 156, wherein the entry cone 156 may include an inlet diameter. As used in this disclosure, an "entry cone" is a cone shape inlet of venturi tube 168 where fluid flows in. In some cases, entry cone 156 may be a converging portion of venturi tube 168. In some embodiments, venturi tube may further include an exit cone 164, wherein the exit cone 164 may include an outlet diameter. As used in this disclosure, an "exit cone" is a cone shape outlet of venturi tube 168 where fluid flows out.

In some cases, exit cone 164 may be a diverging portion of venturi tube 168 In some cases, entry cone 156 and exit cone 164 may be used interchangeably within venturi pump. In a further embodiment, inlet diameter may be greater than outlet diameter.

With continued reference to FIG. 1, in some embodiments, venturi tube 168 may further include a throat 160, wherein the throat comprises a throat diameter. As used in this disclosure, a "throat" is a constricted section of venturi tube 168. In other embodiments, venturi tube 168 may include a plurality of throats 160 across venturi tube 168. In some embodiments, throat 160 may be configured to connect entry cone 156 and exit cone 164. In some cases, the throat diameter is less than either inlet diameter of entry cone 156 or outlet diameter of exit cone 164. In some embodiments, venturi tube 168 may be configured to reduce static pressure of airflow within throat 160. Additionally, or alternatively, entry cone 156 may further include an entry angle, wherein the entry angle is an angle of convergence of venturi tube 168. In some cases, entry angle may include an entry angle range of 15 to 20 degrees. Further, exit cone 164 may further include an exit angle, wherein the exit angle is an angle of divergence of venturi tube 168. In some cases, exit angle may include an exit angle range of 7 to 15 degrees. In a non-limiting example, venturi pump within tertiary duct 152 may include a venturi tube 168, wherein the venturi tube may include an exit angle of an exit cone 164 and an entry angle of an entry cone 156, wherein the exit cone 164 may be connected with the entry cone 156 through a throat 160, and wherein the exit angle is less than the entry angle. In this case, tertiary duct 152 may avoid a flow separation from exit cone 156 and therefore, minimize a loss of potential energy of fluid such as air. In some embodiments, venturi pump is further configured to increase a speed of airflow within tertiary duct 152. In some cases, airflow may include boundary layer flow 132.

With continued reference to FIG. 1, in a non-limiting example, tertiary duct 152 may include a converging-divergent (CD) duct. As used in this disclosure, a "converging-divergent duct" is a nozzle a convergent-divergent configuration, wherein the convergent-divergent configuration includes a fixed convergent section followed by a fixed divergent section for tertiary duct 152. CD duct may be configured to converge exhaust flow down from primary duct 124 (i.e., combustion chamber) to a minimum area, such as, without limitation, throat 160. In some embodiments, throat 160 may be configured to choke the flow such as, without limitation, boundary layer flow 132 within secondary duct 140 as a function of conservation of mass. A person of ordinary skill in the art will appreciate the converging-divergent duct with application of conservation of mass for blocking disturbances upstream into primary duct. Exhaust flow from primary duct 124 may be sonic which means the Mach number of exhaust flow may be equal to one at throat 160. Additionally, or alternatively, tertiary duct 152 may be extended into secondary duct 140. The extended section of tertiary duct 152 may include a tertiary duct nozzle 172. In some embodiments, tertiary duct nozzle may include a progressively shrinking diameters; for instance, and without limitation, tertiary duct nozzle of extended section of tertiary duct 152 may include an outlet diameter at the end of tertiary duct nozzle 172, wherein the outlet diameter may be significantly smaller than any diameters of the rest of tertiary duct such as, without limitation, diameter of tertiary duct inlet near primary duct 124, diameter of throat 160, and the like thereof. In some embodiments, tertiary duct nozzle 172 may include a nozzle angle. In a non-limiting example, extended section of tertiary duct 152 may enter secondary duct 140 in a selected angle (i.e., nozzle angle) which provides an effective speed and momentum for flow within tertiary duct 152 to accelerate boundary layer flow within secondary duct 140. Such tertiary duct nozzle 172 may be configured to "shoot" high-energy flow from primary duct 124 downstream into secondary duct 140 towards outlet 148. In some embodiments, tertiary duct nozzle 172 of extended section of tertiary duct 152 within secondary duct 140 may create a pinch point with secondary duct 140, wherein the pinch point is a point where congestion of high-energy flow (flow with high velocity) and boundary layer flow (flow with low velocity) occurs; thus, producing venturi effect described above in this disclosure. In this case, pinch point may be a basic venturi pump described above in this disclosure. The flow within secondary duct, such as, without limitation flow from tertiary duct and boundary layer flow may accelerate to Mach 1 at outlet 148 under such configurations. A person of ordinary skill in the art will appreciate such configuration of tertiary duct for accelerating boundary layer flow within secondary duct. Extended section and tertiary duct nozzle 172 of tertiary duct 152 may be described in more detail below in reference to FIG. 2.

With contoured reference to FIG. 1, in some embodiments, flow augmentation arrangement 128 may be further configured to mix a high-pressure airflow from propulsor 120 with boundary layer flow 132 within the secondary duck 140 and generate a suction within secondary duct 140. In some cases, mixing high-pressure airflow from propulsor 120 with boundary layer flow 132 may occur at rear portion 116 of nacelle 108. In some cases, suction may occur at forward portion 112 of nacelle 108. In some embodiments, suction may cause ingestion of boundary layer flow 132. In some embodiments, without limitation, tertiary duct 152 within flow augmentation arrangement 128 may be further configured to intake airflow from primary duct 124 to secondary duct 140. In a non-limiting example, an airflow from primary duct 124 may be input to secondary duct 140 through venturi pump within tertiary duct 152, causing an acceleration of a boundary layer flow 132 within secondary duct 140, wherein the airflow may include a higher flow speed than a flow speed of boundary layer flow 132. Further, airflow from primary duct 124 may mix with boundary layer flow 132 in secondary duct 140 and generate a suction in secondary duct 140. Secondary duct 140 may ingest boundary layer flow 132 as a function of suction. Additionally, or alternatively, flow augmentation arrangement 128 may be further configured to mix ingested boundary layer flow from secondary duct 140 with high-pressure airflow within primary duct 124 and generate an additional thrust in primary duct 124. In some embodiments, without limitation, tertiary duct 152 within flow augmentation arrangement 140 may be further configured to intake airflow from secondary duct 140 to primary duct 124. In a non-limiting example, a boundary layer flow 132 from secondary duct 140 may be input to primary duct 124 through venturi pump within tertiary duct 152, causing an acceleration of an airflow within primary duct 124. Further, inputted boundary layer flow 132 may mix with airflow in primary duct 124 and generate a suction in primary duct 140, therefore, allowing propulsor 120 within nacelle 108 to provide more thrust to aircraft. For instance, and without limitation, flow augmentation arrangement may be similar to bypass duct system disclosed in U.S. patent application Ser. No. 17/501,492.

Figure 2:
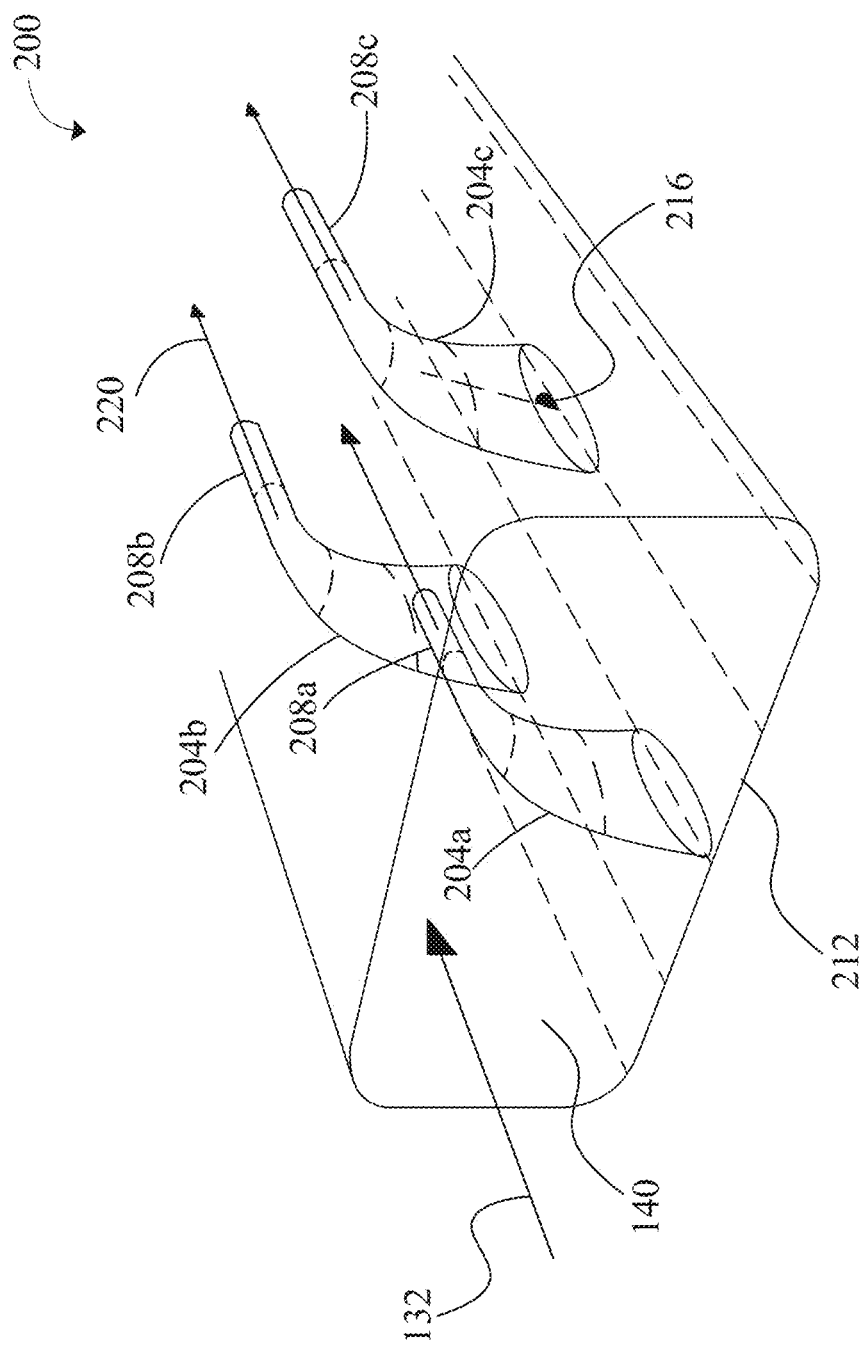
FIG. 2 is an upside-down, see-through exemplary embodiment of multiple notional extended sections placement within secondary duct.

Now referring to FIG. 2, an upside-down, see-through exemplary embodiment of a multiple notional extended sections 204a-c of tertiary ducts with tertiary duct nozzles 208a-c placement within the secondary duct 140 is illustrated. Extended sections (first extended section 204a, second extended section 204b, and third extended section 204c) may enter the secondary duct 140 through the upper wall 212 of secondary duct 140 at a selected nozzle angle 216. Extended sections 204a-c may be configured in a curve shape to align corresponding tertiary duct nozzles 208a-c with the axis of secondary duct 140. In a non-limiting example, tertiary duct nozzles 208a-c may be parallel to boundary layer flow 132 within secondary duct 140. Tertiary duct nozzles 208a-c may exhaust flow 220 such as, without limitation, high energy flow from primary duct 124, into secondary duct 140. Flow 220 may mix with boundary layer flow 132 and accelerate boundary layer flow 132 within secondary duct 140. In some embodiments, without limitation, extended sections 204a-c may also include a streamline shape at upper wall 212 of secondary duct 140. Extended sections 204a-c may transition into circular nozzle such as, without limitation, tertiary duct nozzles 208a-c. In other embodiments, tertiary duct nozzles 208a-c may be configured in other shapes such as, without limitation, ellipse shape, cross shape, star shape, and the like thereof. In a non-limiting example, tertiary duct nozzles 208a-c may be located at approximately the middle plane of the secondary duct 140 (vertically). Such placement of extended sections 204a-c may enable volume of the flow that passes around each tertiary duct nozzle to be equalized. This placement of extended sections 204a-c may be fine-tuned based on variations in secondary duct 140 flow speed across the duct cross section, for instance, and without limitation, tertiary duct nozzles 208a-c may be spaced laterally to (again) provide approximately equal volume around each jet. Additionally, or alternatively, tertiary duct nozzles 208a-c may be staggered longitudinally to avoid obstructing (blocking) the secondary duct 140. Stagger may avoid excessive blockage at any given section of the secondary duct 140. Use of a slender tertiary duct cross section may also be beneficial to this effort. Further, secondary duct 140 may include any number of extended sections and tertiary duct nozzles.

Figure 3:
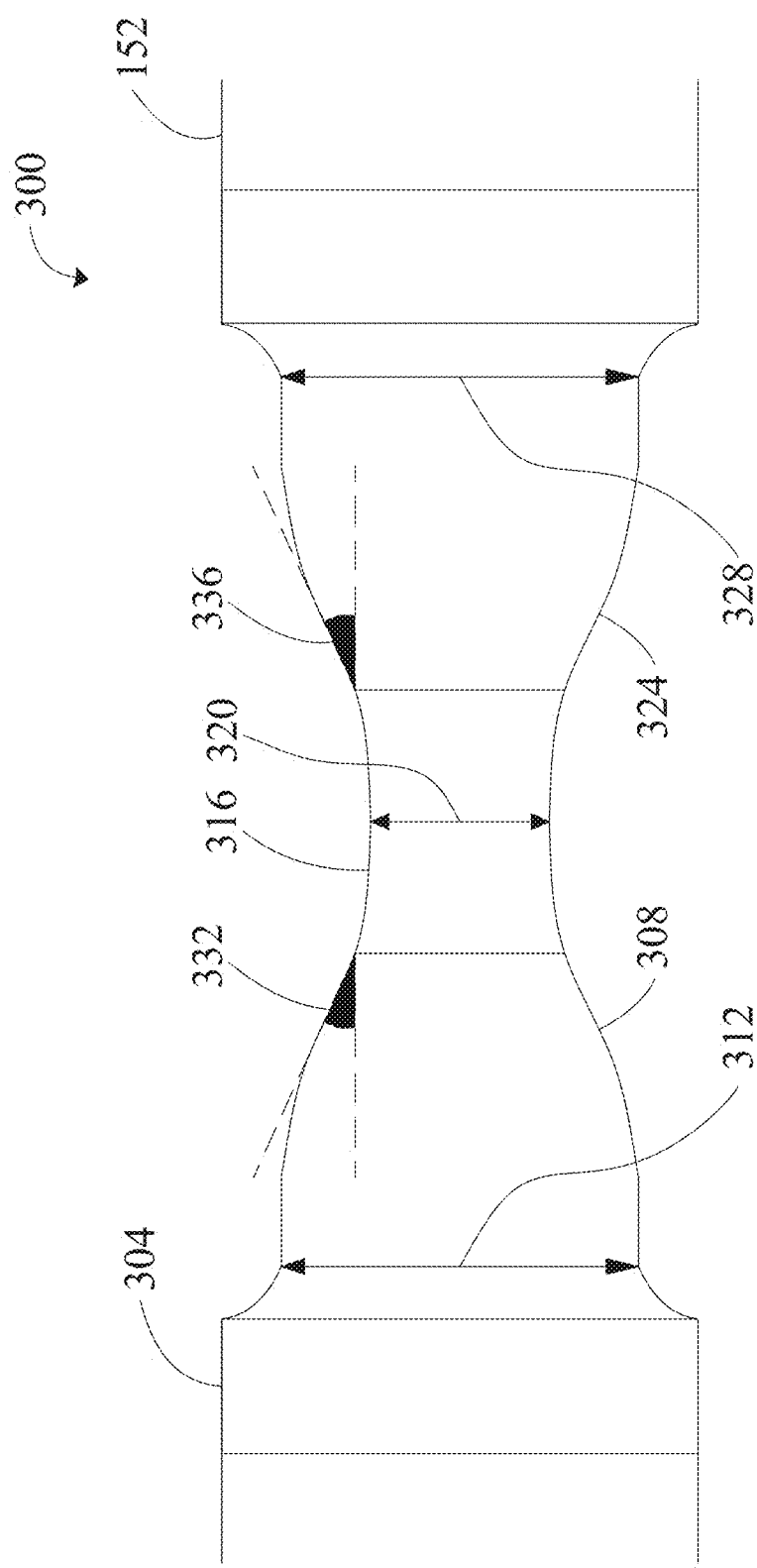
FIG. 3 is an illustration an exemplary venturi pump.

Now referring to FIG. 3, an exemplary diagram of venturi pump 300 is illustrated. Venturi pump 300 may be located within tertiary duct 152. In some embodiments, venturi pump 300 may include a venturi tube 304. In some embodiments, venturi tube 304 may include an entry cone 308, wherein the entry cone 308 may include an entry cone diameter 312. In some cases, entry cone 308 may be an inlet of venturi tube 304. In some embodiments, venturi tube 304 may include an exit cone 324, wherein the exit cone 324 may include an exit cone diameter 328. In some cases, exit cone 324 may be an outlet of venturi tube 304. In some cases, entry cone diameter 312 may be same as exit diameter 328. In other cases, entry cone diameter 312 may be different than exit cone diameter 328. In a non-limiting example, a fluid within tertiary duct 152 may flow into venturi pump 300 pass through venturi tube 304, wherein the fluid may further enter venturi tube 304 through entry cone 308 and exit through exit cone 324.

With continued reference to FIG. 3, venturi tube 304 within venturi pump 300 may include a throat 316, wherein the throat 316 may connect entry cone 308 to exit cone 324. In some embodiments, throat 316 may include a throat diameter 320. In some cases, throat diameter 320 may be smaller than either entry cone diameter 312 or exit cone diameter 328. Additionally, or alternatively, fluid flow from entry cone 308 to exit cone 328 may increase in static pressure at both entry cone 308 and exit cone 328 and decrease in static pressure at throat 316, causing a pressure differential. In some cases, throat 316 may accelerate fluid within venturi tube 304 as a function of pressure differential. Additionally, or alternatively, entry cone 308 may further include an entry angle 332. In some embodiments, entry angle 332 may be an angle of convergence of entry cone 308. In some cases, entry angle 332 may include an entry angle range of 15 to 20 degrees. Further, exit cone 324 may further include an exit angle 336, wherein the exit angle 336 is an angle of divergence of exit cone 324. In some cases, exit angle may include an exit angle range of 7 to 15 degrees.

Figure 4:
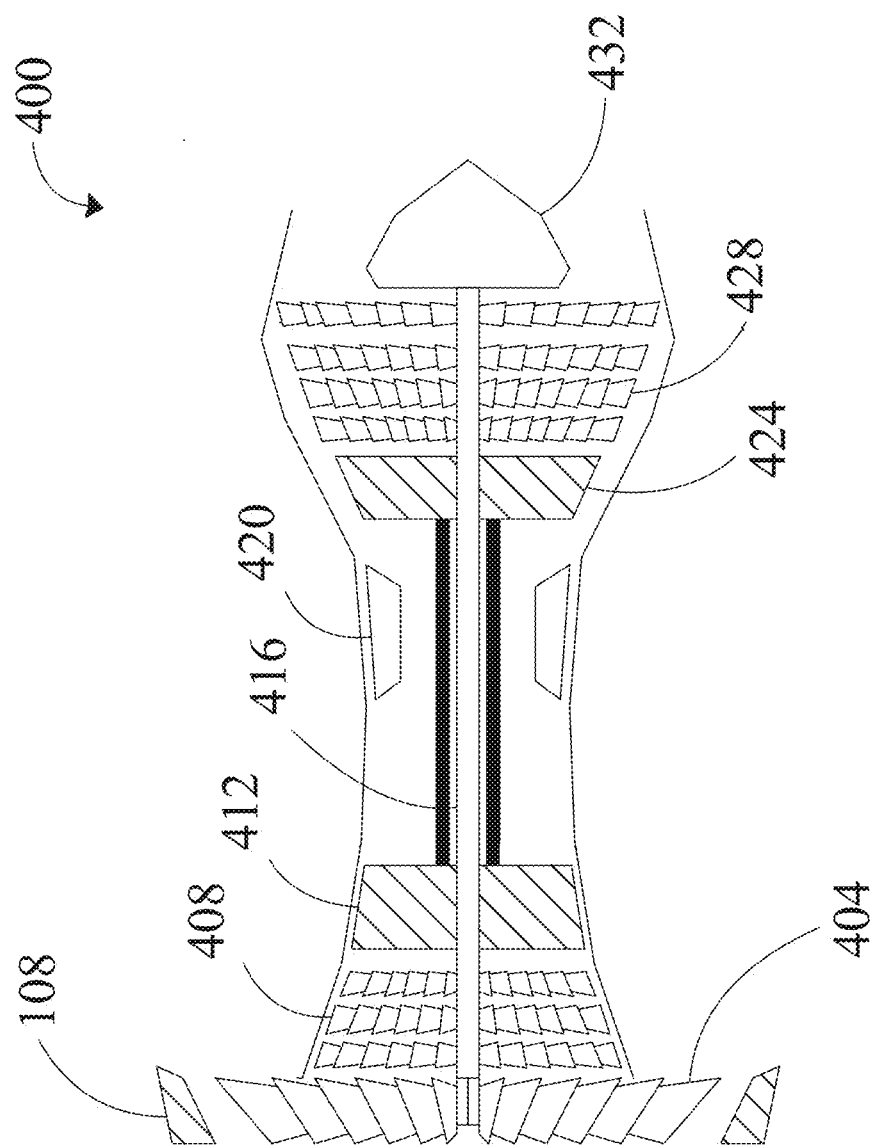
FIG. 4 is a cross-section view of an exemplary turbofan engine.

Referring to FIG. 4, an exemplary diagram of turbofan engine 400 is illustrated. In some embodiments, turbofan engine 400 may be located inside nacelle 108. Nacelle 108 may include any nacelle described above with reference to FIG. 1 in this disclosure. In some embodiments, turbofan engine 400 may include a fan 404, wherein the fan 404 rotates along with a fan shaft 416. In some cases, rotation of fan 404 and fan shaft 416 may be clockwise. In other cases, rotation of fan 404 and fan shaft may be counterclockwise. In some embodiments, fan 404 may include a plurality of fan blades. As used in this disclosure, a "fan shaft" is a rotating spindle on which fan 404 is mounted. In some embodiments, turbofan engine 400 may further include a plurality of air compressors. As used in this disclosure, an "air compressor" is a pneumatic device that converts power into potential energy stored in pressurized air. In some cases, air compressor may be gas turbine engine compressor. Gas turbine engine compressor may include, but is not limited to axial compressor, centrifugal compressor, mixed flow compressor, and the like thereof. In some embodiments, plurality of air compressors may include a low-pressure compressor 408, wherein the low-pressure compressor 408 increases pressure of airflow flow into turbofan engine 400 at a low pressure. In some embodiments, plurality of air compressors may further include a high-pressure compressor 412, wherein the high-pressure compressor 416 increase pressure of airflow flow into turbofan engine 400 at a high pressure. In some embodiments, plurality of air compressors may be mounted on a same shaft such as fan shaft 416. In other embodiments, each air compressor of plurality of air compressors may operate at a different speed.

With continued reference to FIG. 4, additionally, or alternatively, turbofan engine 400 may further include a combustion chamber 420. As used in this disclosure, a "combustion chamber" is an area within turbofan engine 400 where fuel and air are mixed and ignited. In some cases, combustion chamber 420 may inject fuel into airflow. Further, mixture of fuel and air may be combusted and pushed out of turbofan engine 400 in a form of energy. In some embodiments, turbofan engine 400 may further include a plurality of turbines. As used in this disclosure, a "turbine" is a device that convert energy in a stream of fluid into mechanical energy. In some cases, plurality of turbines may include a high-pressure turbine 424, wherein the high-pressure turbine 424 is a first turbine to receive airflow within turbofan engine 400 that efficiently extract work out of high-pressure airflow produced by plurality of compressors. In other cases, plurality of turbines may include a low-pressure turbine 428, wherein the low-pressure turbine 428 is a second turbine to receive airflow within turbofan engine 400 that efficiently extract work out of low-pressure airflow with a low-pressure ratio. In some cases, low-pressure turbine may minimize a negative impact on turbofan engine 400 performance caused by increased exhaust back pressure. Further, turbofan engine 400 may include a plug nozzle 432 at the end of turbofan engine 400, wherein the plug nozzle 432 is a type of nozzle which includes a center body or a plug around which the airflow exhausts. As will be appreciated by persons having ordinary skill in the art, after having read the entirety of this disclosure, the foregoing list is provided by way of example and components of turbofan engine 400 can be added as an extension or improving the apparatus 100 disclosed herein.

Figure 5:
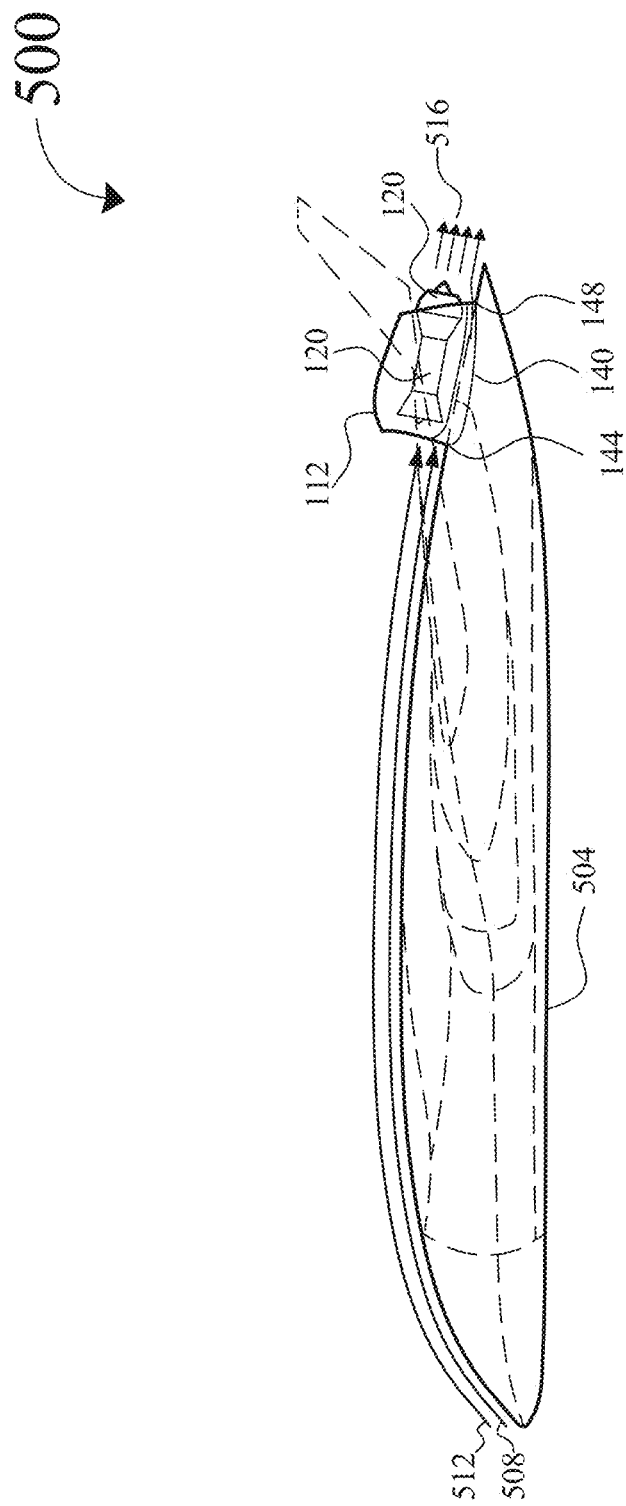
FIG. 5 is a side-view illustration of aircraft having boundary layer flow ingestion.

Now referring to FIG. 5, a side-view of the aircraft 500 is illustrated. In some embodiments, aircraft 500 may include a main body 504. For instance, main body 504 may be a fuselage. In some embodiments, aircraft 500 may further include an aircraft engine, wherein the aircraft engine may be propulsor 120 as described above in reference to FIG. 1. Propulsor may be covered by a nacelle 112 as described above in reference to FIG. 1. In some cases, nacelle 112 may be partially below aft of leading edge of aircraft 500 as described above in reference to FIG. 1. In other cases, nacelle 112 may be located within depression of outer mold line as described above in reference to FIG. 1. It should be understood that this is merely an example, as the presently disclosed subject matter may be used with fully or non-buried nacelles/aircraft engines.

With continued reference to FIG. 5, in some embodiments, aircraft 500 may experience plurality of airflows. In some embodiments, plurality of airflows may include a proximal airflow 508, wherein the proximal airflow 508 generally represents the boundary layer flow 132 that forms on and proximate to OML of main body 504 of aircraft 500. In other embodiments, plurality of airflows may include a distal airflow 512, wherein the distal airflow 512 generally represents free air that flows outside of the proximal airflow 508. It should be noted that the air represented by the airflows 508 and 512 do not have exact or clearly definable layers.

With continued reference to FIG. 5, in some embodiments, proximal airflow 508 (i.e., boundary layer flow 132) may be introduced into inlet 144, moved through secondary duct 140, and exhausted through outlet 148. Although not beholden to one scientific principle, it is understood that turbulent entrainment of proximal airflow 508 essentially "pulls" the airflow 508 into secondary duct 140 and the outlet 148. In a non-limiting example, in the exhaust 516 of propulsor 120, a faster flow of the exhaust 516 is slowed, and a slower flow of proximal airflow 508 is speed up in a "turbulent mixing" cone. In some cases, the increasing of the velocity of proximal airflow 508 creates a vacuum, pulling airflow 508 into secondary duct 140. In other cases, the reduction in pressure in secondary duct 140 (causing pulling of proximal airflow 508 into secondary duct 140) can be felt at inlet 144, reducing the pressure buildup of stagnant boundary layer air, increasing thrust.

With continued reference to FIG. 5, in a different manner than can be found in conventional aircraft, the beneficial effects of the partial vacuum in secondary duct 140 generally increases as the speed of the aircraft 500 increases due to increased propulsor 120 thrust. With higher propulsor 120 thrust, the velocity of exhaust 516 increases. Because the velocity of proximal airflow 508 is essentially constant, as the velocity of exhaust 516 increases, the differential pressure created in "turbulent mixing" cone in exhaust 516 increases, thus increasing the amount of proximal airflow 508 pulled into exhaust 516 and the accompanying benefits. In further embodiments, at some general location downstream of aircraft 500, proximal airflow 508 and exhaust 516 are completely mixed, with constant pressure and turbulent flow. Other types of mechanisms may be used to introduce the proximal airflow 212, such as, but not limited to, venturi pump and the like. Venturi pump may be any venturi pump disclosed above in reference to FIGS. 1 and 2. Further disclosure relating to ways of incorporating boundary layer ingestion may be found in U.S. Pat. No. 11,396,365, filed on Oct. 14, 2021, and entitled "DRAG RECOVERY SCHEME USING BOUNDARY LAYER INGESTION," the entirety of which is incorporated herein by reference.

Figure 6:
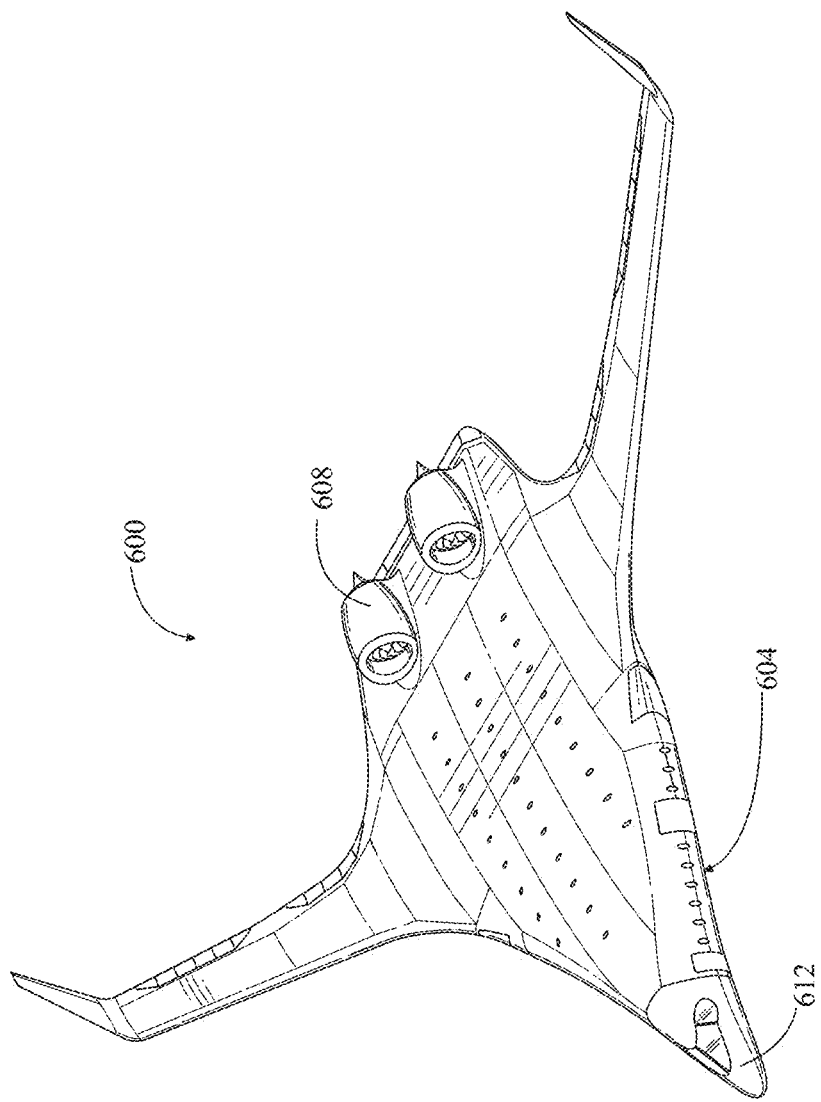
FIG. 6 is a schematic of an exemplary blended wing aircraft.
Figure 7:
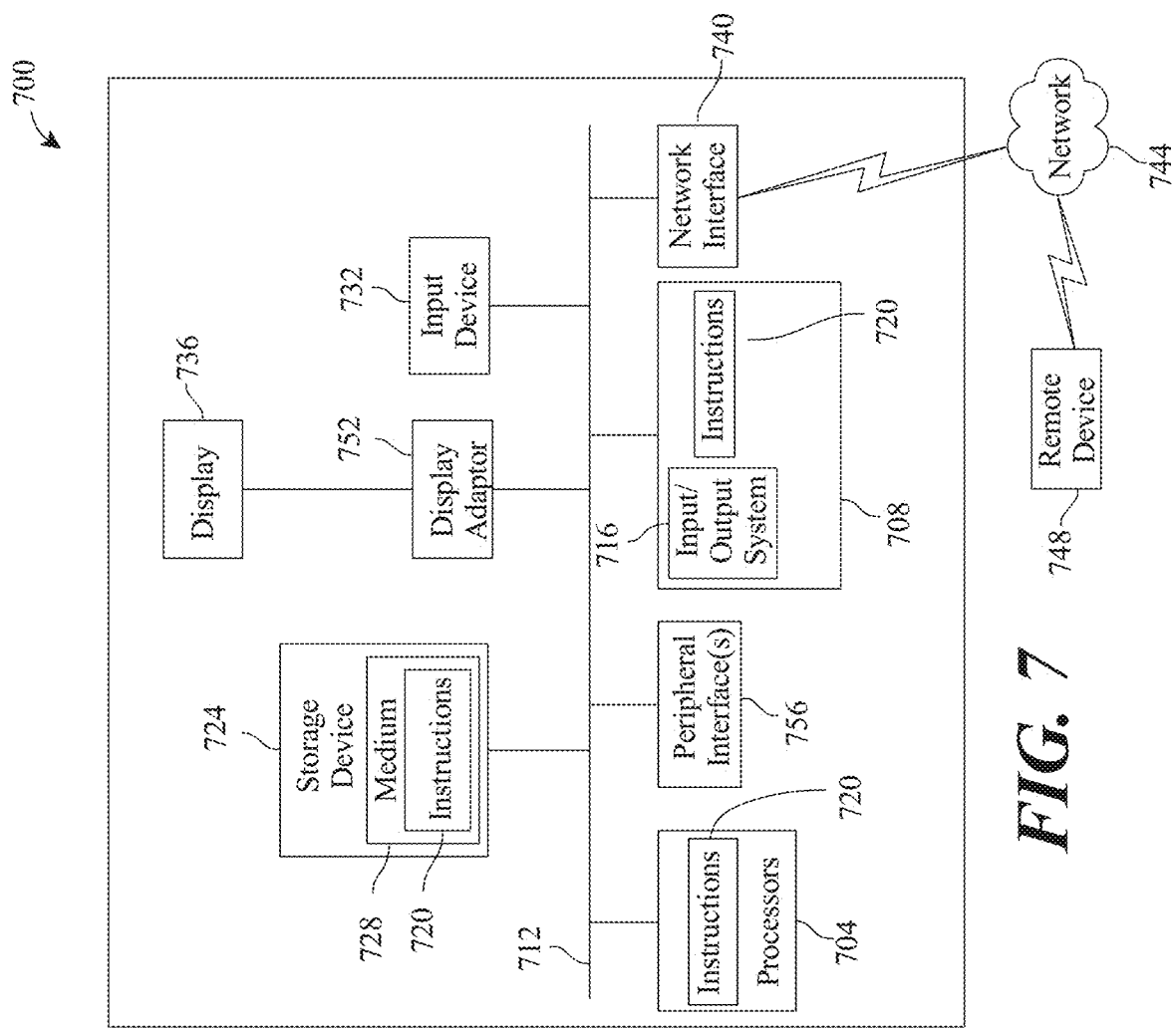
FIG. 7 is a block diagram of a computing system that can be used to implement any one or more of the methodologies disclosed herein and any one or more portions thereof.

Referring to FIG. 6, an exemplary blended wing aircraft 600 is illustrated. Aircraft 600 may include a blended wing body 604. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 604 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 604 design may or may not be tailless. One potential advantage of a BWB 604 may be to reduce wetted area and any accompanying drag associated with a conventional wing-body junction. In some cases, a BWB 604 may also have a wide airfoil-shaped body, allowing entire aircraft to generate lift and thereby facilitate reduction in size and/or drag of wings. In some cases, a BWB 604 may be understood as a hybrid shape that resembles a flying wing, but also incorporates features from conventional aircraft. In some cases, this combination may offer several advantages over conventional tube-and-wing airframes. In some cases, a BWB airframe 604 may help to increase fuel economy and create larger payload (cargo or passenger) volumes within the BWB. BWB 604 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 6, BWB 604 of aircraft 600 may include a nose portion. A "nose portion," for the purposes of this disclosure, refers to any portion of aircraft 600 forward of the aircraft's fuselage 616. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 6, BWB 604 may include at least a structural component of aircraft 600. Structural components may provide physical stability during an entirety of an aircraft's 600 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 600 structure, they may be so named A, B, C, and so on named from nose to tail. Pillars, like any structural element, may be disposed a distance away from each other, along an exterior of aircraft 600 and BWB 604. Depending on manufacturing method of BWB 604, pillars may be integral to frame and skin, comprised entirely of internal framing, or alternatively, may be only integral to structural skin elements. Structural skin will be discussed in greater detail below.

With continued reference to FIG. 6, BWB 604 may include a plurality of materials, alone or in combination, in its construction. At least a BWB 604, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 604 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 604 may additionally or alternatively use wood or another suitably strong yet light material for an internal structure.

With continued reference to FIG. 6, aircraft 600 may include monocoque or semi-monocoque construction. BWB 604 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 6-10 micrometers and include a high percentage (i.e. above 86%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 6, BWB 604 may include at least a fuselage. A "fuselage," for the purposes of this disclosure, refers to a main body of an aircraft 600, or in other words, an entirety of the aircraft 600 except for nose, wings, empennage, nacelles, and control surfaces. In some cases, fuselage may contain an aircraft's payload. At least a fuselage may comprise structural components that physically support a shape and structure of an aircraft 600. Structural components may take a plurality of forms, alone or in combination with other types. Structural components vary depending on construction type of aircraft 600 and specifically, fuselage. A fuselage 612 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 6, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 600. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 600 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 6, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 6, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 6, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 6, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 6, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 6, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 600 is in its level flight orientation or sitting on ground. A post may act similarly to stringer in that it is configured to support axial loads in compression due to a load being applied parallel to its axis due to, for example, a heavy object being placed on a floor of aircraft 600. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 6, aircraft 600 may include at least a flight component 608. A flight component 608 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 600 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 600. In some embodiments, at least a flight component 608 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 6, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 6, at least a flight component may be one or more devices configured to affect aircraft's 600 attitude. "Attitude", for the purposes of this disclosure, is the relative orientation of a body, in this case aircraft 600, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 600. A plurality of attitude datums may indicate one or more measurements relative to an aircraft's pitch, roll, yaw, or throttle compared to a relative starting point. One or more sensors may measure or detect an aircraft's 600 attitude and establish one or more attitude datums. An "attitude datum", for the purposes of this disclosure, refers to at least an element of data identifying an attitude of an aircraft 600.

With continued reference to FIG. 6, in some cases, aircraft 600 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 6, in some cases, aircraft 600 may include at least a pilot control. As used in this disclosure, a "pilot control," is an interface device that allows an operator, human or machine, to control a flight component of an aircraft. Pilot control may be communicatively connected to any other component presented in aircraft 600, the communicative connection may include redundant connections configured to safeguard against single-point failure. In some cases, a plurality of attitude datums may indicate a pilot's instruction to change heading and/or trim of an aircraft 600. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 600. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 608 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 6, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 608. At least a flight component 608 may include any propulsor as described herein. In embodiment, at least a flight component 608 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 6, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements.

"Capacitance", for the purposes of this disclosure, is the ability of a system to store an electric charge, in this case the system is a parcel of air which may be near, adjacent to, or above a battery cell.

With continued reference to FIG. 6, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 6, at least a flight component 608 may include wings, empennages, nacelles, control surfaces, fuselages, and landing gear, among others, to name a few. In embodiments, an empennage may be disposed at the aftmost point of an aircraft body 604. Empennage may comprise a tail of aircraft 600, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 600 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 600 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 604 aircraft 600 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 608 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 608 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 600. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 600 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 6, aircraft 600 may include an energy source. Energy source may include any device providing energy to at least a flight component 608, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 6, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 604 of aircraft 600, for example without limitation within a wing portion 612 of blended wing body 608. Aviation fuels may include petroleum-based fuels, or petroleum and synthetic fuel blends, used to power aircraft 600. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 600. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 6, modular aircraft 600 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 6, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 6 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 6, aircraft 600 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 6, aircraft 600 may include multiple flight component 608 sub-systems, each of which may have a separate energy source. For instance, and without limitation, one or more flight components 608 may have a dedicated energy source. Alternatively, or additionally, a plurality of energy sources may each provide power to two or more flight components 608, such as, without limitation, a "fore" energy source providing power to flight components located toward a front of an aircraft 600, while an "aft" energy source provides power to flight components located toward a rear of the aircraft 600. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 608. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 6, aircraft 600 may include a flight component 608 that includes at least a nacelle 608. When attached by a pylon entirely outside an airframe 604 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 600 partially or wholly enveloped by an outer mold line of the aircraft 600. At least a nacelle may be designed to be streamlined. At least a nacelle may be asymmetrical about a plane comprising the longitudinal axis of the engine and the yaw axis of modular aircraft 600.

With continued reference to FIG. 6, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 6, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 6, in nonlimiting embodiments, at least a flight component 608 may include an airbreathing engine such as a jet engine, turbojet engine, turboshaft engine, ramjet engine, scramjet engine, hybrid propulsion system, turbofan engine, or the like. At least a flight component 608 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 6, an aircraft 600 may include a flight controller. As used in this disclosure, a "flight controller" is a device that generates signals for controlling at least a flight component 608 of an aircraft 600. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 6, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 600 and/or computing device.

With continued reference to FIG. 6, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for ingesting boundary layer flow on an aircraft, wherein the apparatus comprises:
   a blended wing body, wherein the blended wing body is characterized by having no clear dividing line between wings and main body of the aircraft;
   a nacelle located aft of a leading edge of the blended wing body, wherein the nacelle further comprises:
      a propulsor configured to propel the aircraft; and
      a primary duct, wherein the primary duct is configured to intake an airflow from a forward portion of the nacelle to a rear portion of the nacelle; and
   a flow augmentation arrangement, wherein the flow augmentation arrangement is configured to accelerate a boundary layer flow in the airflow, wherein the flow augmentation arrangement further comprises:
      a secondary duct, wherein the secondary duct is configured to ingest the boundary layer flow in the airflow from an inlet proximal to the forward portion of the nacelle to an outlet proximal to the rear portion of the nacelle; and
      a tertiary duct connecting the primary duct to the secondary duct, wherein the tertiary duct comprises an extended section located within the secondary duct.

2. The apparatus of claim 1, wherein the nacelle is disposed on at least an airfoil segment of a plurality of airfoil segments of the BWB, wherein the at least an airfoil segment comprises the leading edge.

3. The apparatus of claim 2, wherein the at least an airfoil segment further comprises an outer mold line (OML) having a depression.

4. The apparatus of claim 3, wherein the depression in the OML is configured to enlarge the secondary duct.

5. The apparatus of claim 1, wherein the primary duct comprises a NACA duct.

6. The apparatus of claim 1, wherein the flow augmentation arrangement is configured to:
   create an additional flow in the secondary duct, wherein the additional flow comprises a flow velocity greater than a flow velocity of the boundary layer flow.

7. The apparatus of claim 1, wherein the secondary duct is located below the primary duct and within a depression in an outer mold line of the blended wing body.

8. The apparatus of claim 1, wherein the secondary duct is further configured to:
   route the boundary layer flow around the nacelle; and
   exhaust the boundary layer flow from the rear portion of the nacelle.

9. The apparatus of claim 1, wherein the secondary duct is further configured to prevent a turbulent boundary layer flow from entering the primary duct.

10. The apparatus of claim 6, wherein the tertiary duct is configured to direct the additional flow from the primary duct to the secondary duct.

11. The apparatus of claim 1, wherein accelerating the boundary layer flow using the flow augmentation arrangement comprises utilizing a venturi effect.

12. The apparatus of claim 1, wherein the tertiary duct is further configured to intake airflow from the primary duct to the secondary duct.

13. The apparatus of claim 1, wherein the tertiary duct is further configured to intake airflow from the secondary duct to the primary duct.

14. The apparatus of claim 1, wherein the extended section comprises a tertiary duct nozzle.

15. The apparatus of claim 14, wherein the tertiary duct nozzle comprises:
   a convergent-divergent configuration, wherein the tertiary duct nozzle under the convergent-divergent configuration comprises a fixed convergent section and a fixed divergent section.

16. The apparatus of claim 6, wherein the secondary duct comprises a pinch point where congestion of the additional flow and the boundary occurs.

17. The apparatus of claim 15, wherein the tertiary duct nozzle is configured to shoot a flow from primary duct downstream into the secondary duct towards the outlet.

18. The apparatus of claim 1, wherein accelerating the boundary layer flow comprises accelerating the boundary layer flow to Mach 1 at the outlet using the flow augmentation arrangement.

19. The apparatus of claim 1, wherein the flow augmentation arrangement is further configured to:
   mix a airflow from the primary duct with the boundary layer flow within the secondary duct; and
   generate a suction in the secondary duct.

20. The apparatus of claim 1, wherein the flow augmentation arrangement is further configured to:
   mix ingested boundary layer flow from the secondary duct with a airflow within the primary duct; and
   generate an additional thrust in the primary duct.

* * * * *